US012771618B2

(12) United States Patent
Miller et al.

(10) Patent No.: US 12,771,618 B2
(45) Date of Patent: Oct. 20, 2026

(54) USING A HIDDEN MARKOV MODEL TO CALCULATE THE PROBABILITY OF AN UNDERLYING ISSUE IN A NETWORK MONITORING SYSTEM

(71) Applicant: Cisco Technology, Inc., San Jose, CA (US)

(72) Inventors: Gad Miller, Paris (FR); Tristan Hugues Emile Victor Besson, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 18/592,155

(22) Filed: Feb. 29, 2024

(65) Prior Publication Data

US 2025/0279938 A1 Sep. 4, 2025

(51) Int. Cl.
*H04L 41/14* (2022.01)
*H04L 41/0631* (2022.01)

(52) U.S. Cl.
CPC ........ *H04L 41/145* (2013.01); *H04L 41/0631* (2013.01)

(58) Field of Classification Search
CPC .......................... H04L 41/145; H04L 41/0631
See application file for complete search history.

(56) References Cited

U.S. PATENT DOCUMENTS 11,044,533 B1 * 6/2021 Li ...................... H04N 21/2402
11,336,506 B1 * 5/2022 Li ...................... H04N 21/2402
2002/0198984 A1 * 12/2002 Goldstein ............. H04L 67/535 714/E11.181
2019/0155672 A1 * 5/2019 Wang .................... G06F 11/079
2019/0235944 A1 8/2019 Velipasaoglu et al.
2020/0145448 A1 5/2020 Vu et al.
2020/0244673 A1 7/2020 Stockdale et al.
2020/0301385 A1 * 9/2020 Bianchi ................ G05B 19/042

FOREIGN PATENT DOCUMENTS

CN 114978617 A 8/2022
CN 115296902 A 11/2022

OTHER PUBLICATIONS

Eisner J., "An Interactive Spreadsheet for Teaching the Forward-Backward Algorithm", Proceedings of the Workshop on Effective Tools and Methodologies for Teaching Natural Language Processing and Computational Linguistics, Philadelphia, Jul. 2002, 9 Pages.
Jurafsky D., et al., "Hidden Markov Models", Speech and Language Processing, draft of Feb. 3, 2024, pp. 1-17.
Rabiner L.R., et al., "A Tutorial on Hidden Markov Models and Selected Applications in Speech Recognition", Proceedings of the IEEE, vol. 77, No. 2, Feb. 1989, pp. 257-286.

* cited by examiner

*Primary Examiner* — Philip C Lee
(74) *Attorney, Agent, or Firm* — Merchant & Gould P.C.; Kenneth J. Heywood

(57) ABSTRACT

In one embodiment, a device receives, via a user interface, a selection of agents in a network. The device detects, based on data from the selection of agents, anomalies in the network. The device determines a probability of an issue in the network based on a number of the selection of agents associated with the anomalies. The device provides, based on the probability, an alert indicative of the issue to the user interface.

20 Claims, 9 Drawing Sheets

USING A HIDDEN MARKOV MODEL TO CALCULATE THE PROBABILITY OF AN UNDERLYING ISSUE IN A NETWORK MONITORING SYSTEM

TECHNICAL FIELD

The present disclosure relates generally to computer networks, and, more particularly, to using a Hidden Markov Model (HMM) to calculate the probability of an underlying issue in a network monitoring system.

BACKGROUND

Computer networks are large-scale distributed systems governed by complex dynamics and a very large number of parameters, both of which continue to increase as technology advances. Accordingly, the types and amount of network telemetry that a network monitoring system collects and consumes also continue to increase, year after year. This increasing complexity makes identifying and diagnosing network issues challenging tasks, as one issue could have a cascading effect across the network.

With the recent advancements in artificial intelligence (AI)/machine learning (ML), it now becomes possible to make inferences about large volumes of telemetry data in near real-time. For instance, one category of AI/ML tasks relates to the detection of anomalies in time series of telemetry data. Generally, anomaly detection models operate by first establishing a baseline behavior and then looking for sudden changes in that behavior over time (e.g., network traffic is typically almost non-existent at 2:00 AM, but suddenly spikes one night).

While anomaly detection can be a powerful analytics tool in a network monitoring system, the detection of an anomaly alone does not indicate an underlying issue. Indeed, an anomaly simply indicates a change in behavior, not that something is actually 'wrong' (e.g., a spike in traffic at 2:00 AM may be due to the presence of malware or could equally be attributable to an employee working late). Thus, identifying an actual issue from a detected anomaly or set of anomalies often remains difficult in today's networks.

DESCRIPTION OF EXAMPLE EMBODIMENTS

Overview

According to one or more embodiments of the disclosure, a device receives, via a user interface, a selection of agents in a network. The device detects, based on data from the selection of agents, anomalies in the network. The device determines a probability of an issue in the network based on a number of the selection of agents associated with the anomalies. The device provides, based on the probability, an alert indicative of the issue to the user interface.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
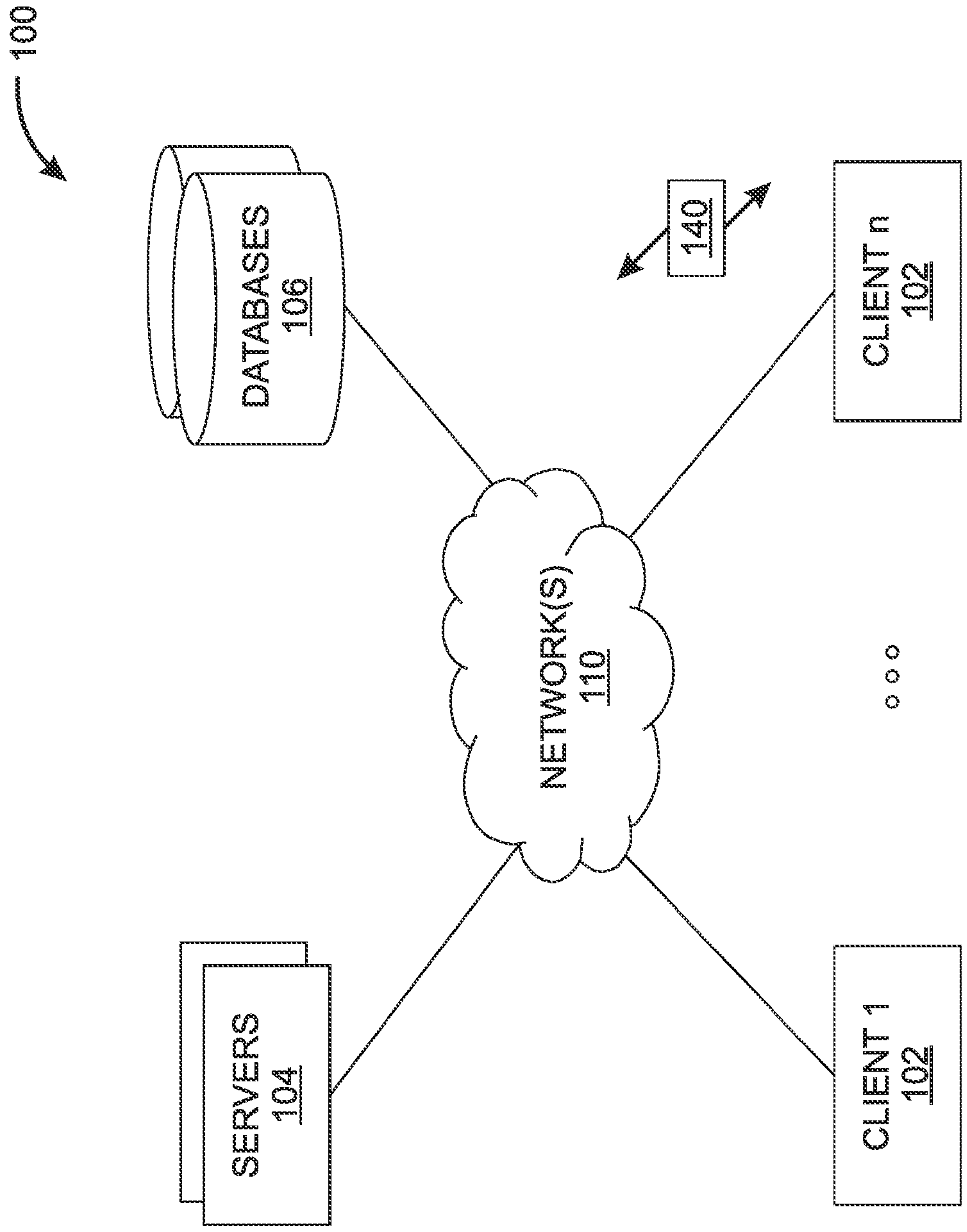
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
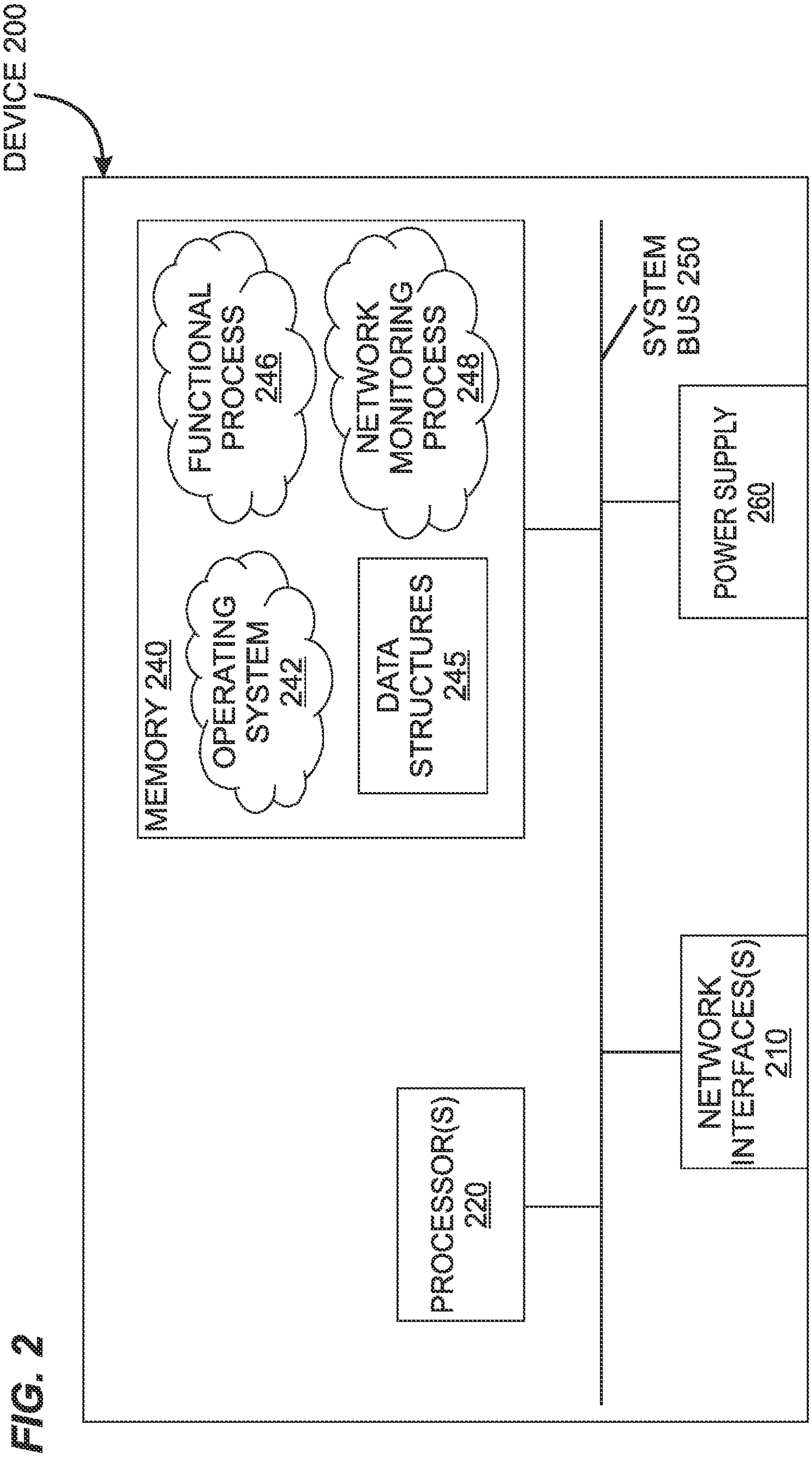
FIG. 2 illustrates an example computing device/node.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative network monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, network monitoring process 248 may include computer executable instructions that, when executed by processor(s) 220, cause device 200 to perform the techniques described herein. To do so, in some embodiments, network monitoring process 248 may utilize machine learning. In general, machine learning is concerned with the design and the development of techniques that take as input empirical data (such as network statistics and performance indicators) and recognize complex patterns in these data.

In various embodiments, network monitoring process 248 may employ one or more supervised, unsupervised, or semi-supervised machine learning models. Generally, supervised learning entails the use of a training set of data, as noted above, that is used to train the model to apply labels to the input data. For example, the training data may include sample data indicative of a particular network issue or not. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network monitoring process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network monitoring process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network monitoring, network monitoring process 248 may use a generative model to generate synthetic network traffic based on existing user traffic to test how the network reacts. Example generative approaches can include, but are not limited to, generative adversarial networks (GANs), large language models (LLMs), other transformer models, and the like.

Figure 3:
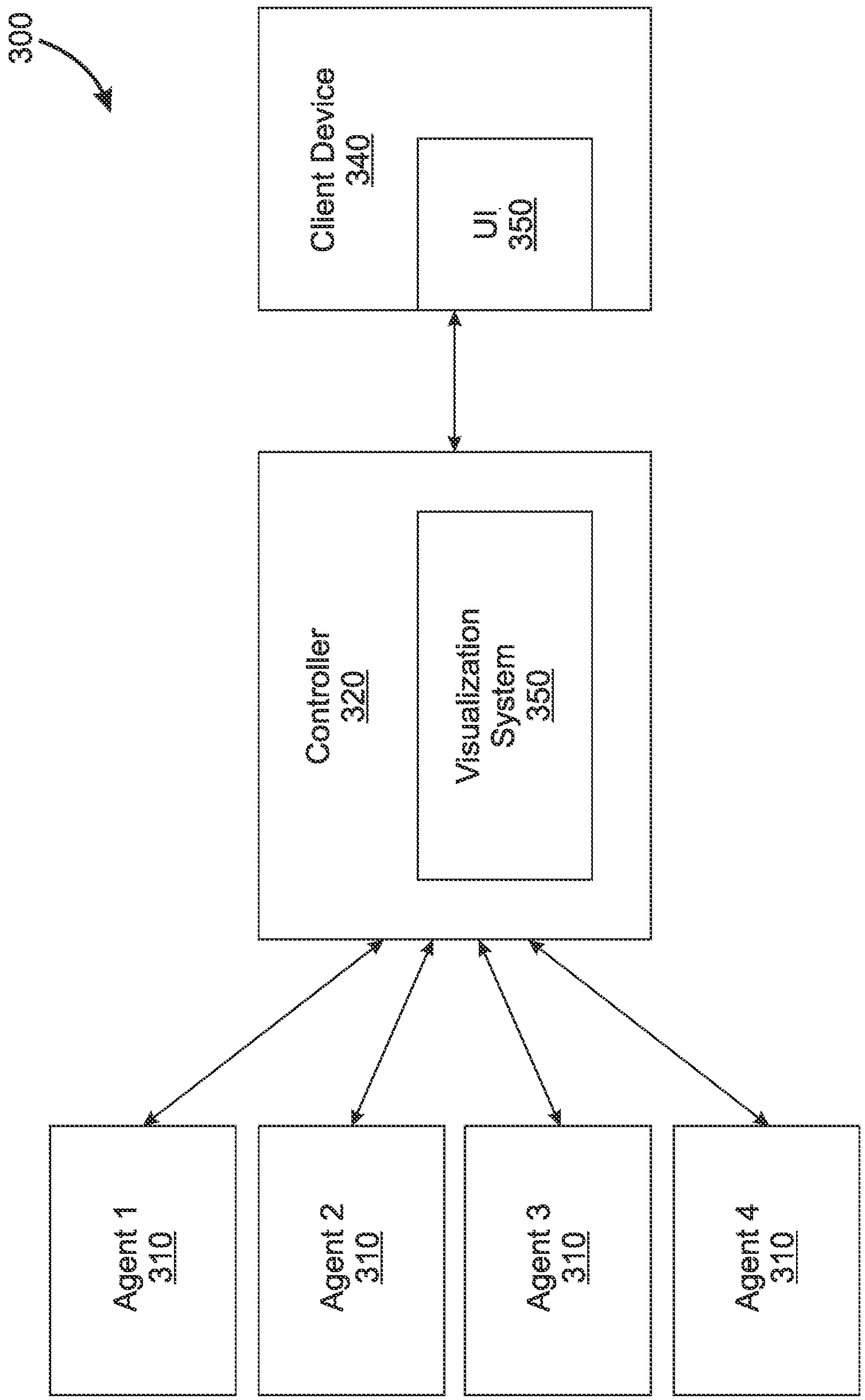
FIG. 3 illustrates an example network monitoring system.

FIG. 3 illustrates an example network monitoring system 300, according to various embodiments. In general, network monitoring system 300 is a platform that monitors and collects metrics and other performance data for a network and/or application environment being monitored. To do so, network monitoring system 300 may include any number of agents 310 distributed throughout a network in communication with a controller 320 (e.g., a device 200). Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

In general, agents 310 may be configured to collect telemetry regarding the operation of the network and report that telemetry data, and/or data derived therefrom, to controller 320. In turn, controller 320 may provide information regarding the network via a visualization system 350, such as by sending display data to a user interface (UI) 330 executed by a client device 340. In various instances, controller 320 may report the raw telemetry data from agents 310, aggregated data derived from the telemetry, or information that controller 320 itself generates based on its analysis of the data that it received from agents 310. For instance, controller 320 may apply any number of machine learning models (e.g., through execution of network monitoring process 248) to the data that it receives from agents 310 for purposes of detecting anomalies in the network, making predictions about the future state of the network, identifying issues in the network, among other tasks.

Agents 310 may take any of a variety of forms and may be deployed for execution by endpoints in the network (e.g., user devices), networking equipment (e.g., routers, switches, etc.), servers, or the like. During execution, agents 310 may collect telemetry data regarding its executing device, such as the available or used resources of that device, queue state information, etc. In further instances, agents 310 may collect telemetry regarding the network paths in the network, such as by collecting traffic telemetry data. In some instances, agents 310 may also perform path testing to generate telemetry data. For instance, agents 310 may send probe packets along a path towards an intended destination and collect information about how those packets were processed along the path.

In some cases, agents 310 may perform some analytics locally on their collected telemetry. For instance, agents 310 may aggregate telemetry metrics, perform analytics (e.g., anomaly detection, etc.) on the telemetry data, or the like. In turn, agents 310 may report the results of this analysis to controller 320.

As noted above, network monitoring systems, such as network monitoring system 300, may leverage anomaly detection to assess the behavior of the network over time. Generally, anomaly detection models operate by first establishing a baseline behavior and then looking for sudden changes in that behavior over time (e.g., network traffic is typically almost non-existent at 2:00 AM, but suddenly spikes one night).

While anomaly detection can be a powerful analytics tool in a network monitoring system, the detection of an anomaly alone does not indicate an underlying issue. Indeed, an anomaly simply indicates a change in behavior, not that something is actually 'wrong' (e.g., a spike in traffic at 2:00 AM may be due to the presence of malware or could equally be attributable to an employee working late). Thus, identifying an actual issue from a detected anomaly or set of anomalies often remains difficult in today's networks.

Using a Hidden Markov Model to Calculate the Probability of an Underlying Issue in a Network Monitoring System The techniques herein allow for the detection of underlying issues in a network based on multiple anomaly time series. Typically, these time series represent different vantage points of the underlying issue (e.g., the locations of agents 310 in the network). More specifically, the techniques herein introduce a Hidden Markov Model (HMM)-based approach that calculates the probability of there existing an issue in the network, given the detection of anomalies in the network.

Specifically, according to one or more embodiments of the disclosure as described in detail below, a device receives, via a user interface, a selection of agents in a network. The device detects, based on data from the selection of agents, anomalies in the network. The device determines a probability of an issue in the network based on a number of the selection of agents associated with the anomalies. The device provides, based on the probability, an alert indicative of the issue to the user interface.

Illustratively, the techniques described herein may be performed by hardware, software, and/or firmware, such as in accordance with the network monitoring process 248, which may include computer executable instructions executed by the processor 220 (or independent processor of interfaces 210) to perform functions relating to the techniques described herein.

Operationally, the techniques herein rely on a Hidden Markov Model (HMM) to determine the probability of there being an issue in the monitored network, given the anomalies indicated by the telemetry collected by any number of distributed agents in the network (e.g., at a given point in time and/or in the past). Of course, such anomalies may correspond to behavioral anomalies detected using machine learning or may even include predefined anomalies (e.g., certain status codes, values exceeding a defined threshold, etc.). As would be appreciated, a Markov chain is a model that involves probabilities of sequences of random variables (i.e., states), each of which can take on values from some set. For instance, consider the case of three simple weather states: hot, warm, and cold. Transitions between these states (or for the state to remain the same) across two time periods have associated probabilities.

For instance, Table 1 below illustrates example probabilities of state transitions for the weather example above:

TABLE 1

| Current State | Next State | Probability |
|---|---|---|
| Hot | Hot | 0.6 |
| Hot | Cold | 0.1 |
| Hot | Warm | 0.3 |
| Cold | Cold | 0.8 |
| Cold | Hot | 0.1 |
| Cold | Warm | 0.1 |
| Warm | Warm | 0.6 |
| Warm | Cold | 0.1 |
| Warm | Hot | 0.3 |

This Markov assumption is that to predict the future state of the system, if the current state is known, the past brings no further information. More formally, consider a sequence of state variables $q_1, q_2, \ldots, q_i$. The Markov assumption is then:

$$P(q_i = a \mid q_1 \ldots q_{i-1}) = P(q_i = a \mid q_{i-1})$$

In other words, the state transitions are probabilities, meaning that the values of transitions leaving a given state must sum to 1. This allows any Markov chain to be defined using the three components below, to compute the probability of any given sequence:

Q=q1, q2, . . . qN: a set of N states

A=a11, a12, . . . an1, . . . ann is a transition probability matrix A, with each aij representing the probability of moving from state i to state j π=π1, π2, . . . , πN is an initial probability distribution over the states, where πi is the probability that the Markov chain will start in state i.

A Markov chain is useful to compute a probability for a sequence of observable events. In many cases, however, the events of interest are hidden in that they are not observed directly. Continuing with the above example of weather states, assume that there are no actual temperature measurements, but only counts of the number of ice creams eaten by individuals during that day. In such a case, the actual weather states are hidden, with the count of ice creams being the observations.

A Hidden Markov Model (HMM) considers both observed events (like the number of ice creams eaten) and hidden events (like the weather) that can be viewed as causal factors in a probabilistic model. Generally, an HMM may be defined using the following components:

Q=q1, q2, . . . , qN: a set of N states

A=a11, a12, . . . an1, . . . ann is a transition probability matrix A, with each aij representing the probability of moving from state i to state j O=o1, o2, . . . , oT: a sequence of T observations, each one drawn from a vocabulary V=v1, v2, . . . , vV B=bi (ot): a sequence of observation likelihoods, also called emission probabilities, each expressing the probability of an observation of being generated from a state i π=π1, π2, . . . , πN is an initial probability distribution over the states, where πi is the probability that the Markov chain will start in state i In the context of network monitoring, one can view certain issues in a network as hidden states. For instance, consider the case of a server having two hidden states: UP and DOWN. Without direct observation of the server, such as from the perspective of the network, these states are indeed hidden states. In such a case, network monitoring process 248 may model the system as a Markov chain as follows:

q0 and q1 the set of server states for UP and DOWN statuses of the server, respectively.

A=a01, a10, a01, a11 a transition probability matrix A, each aij representing the probability of moving from state i to state j.

π=π0, π1 an initial probability distribution over states. πi is the probability that the Markov chain will start in state i, meaning the probability to start a sequence of observations with the server being UP or DOWN.

Figure 4A:
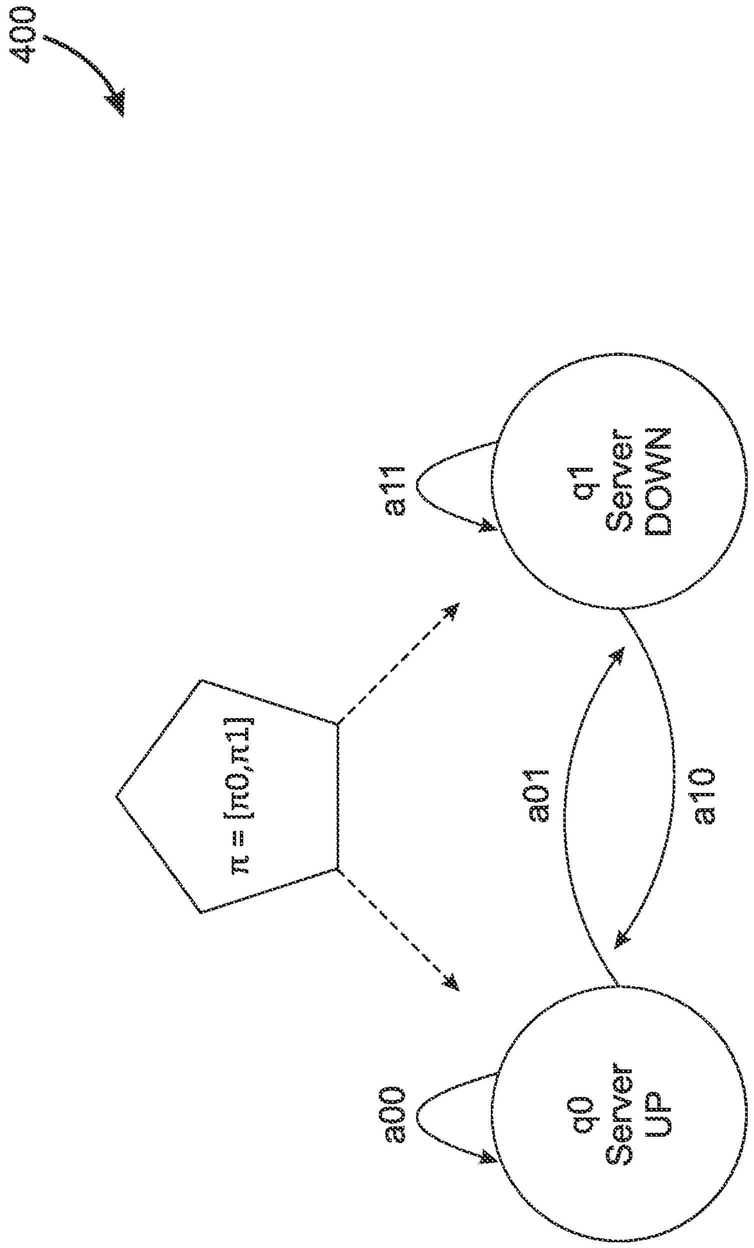
FIGS. 4A-4B illustrate example Markov chains for identifying network issues.

For instance, FIG. 4A illustrates an example Markov chain 400 in accordance with the above definition. Unfortunately, though, the server states cannot be observed directly. Instead, network monitoring process 248 may rely on several agents in the network (e.g., agents 310) performing a test and obtaining different metrics regarding the server health (e.g., by sending probe packets towards the server).

As a result of the testing by the agents, there may be a time series per tuple of test, agent, and metric. In turn, network monitoring process 248 may apply anomaly detection to these time series. This anomaly detection amounts to a transformation of the metric time series to binary time series, indicating the presence or absence of an anomaly.

Consider the time series obtained by aggregating this anomaly time series over all agents so that, at each point in time, there is the total number of agents for which an anomaly was detected (at that point in time) for a given test and metric. Doing so allows 248 to consider the server state as a hidden state, and the anomaly count as the observed random variables of an HMM, as defined as follows:

q0 and q1 the set of server states for respectively an UP and DOWN status of the server A=a01, a10, a01, a11 a transition probability matrix A, each aij representing the probability of moving from state i to state j =o1, o2, . . . oT a sequence of T observations representing the number of anomalous agents detected as being anomalous by the anomaly detector, from the vocabulary V={0, 1, 2, . . . max_num_agents}

B=bi (ot) a sequence of observation likelihoods, also called emission probabilities, each expressing the probability of observing a given number of anomalous agents at timestamp t knowing that the server is in status qi.

π=π0, π1 an initial probability distribution over states. πi is the probability that the Markov chain will start in state i.

Figure 4B:
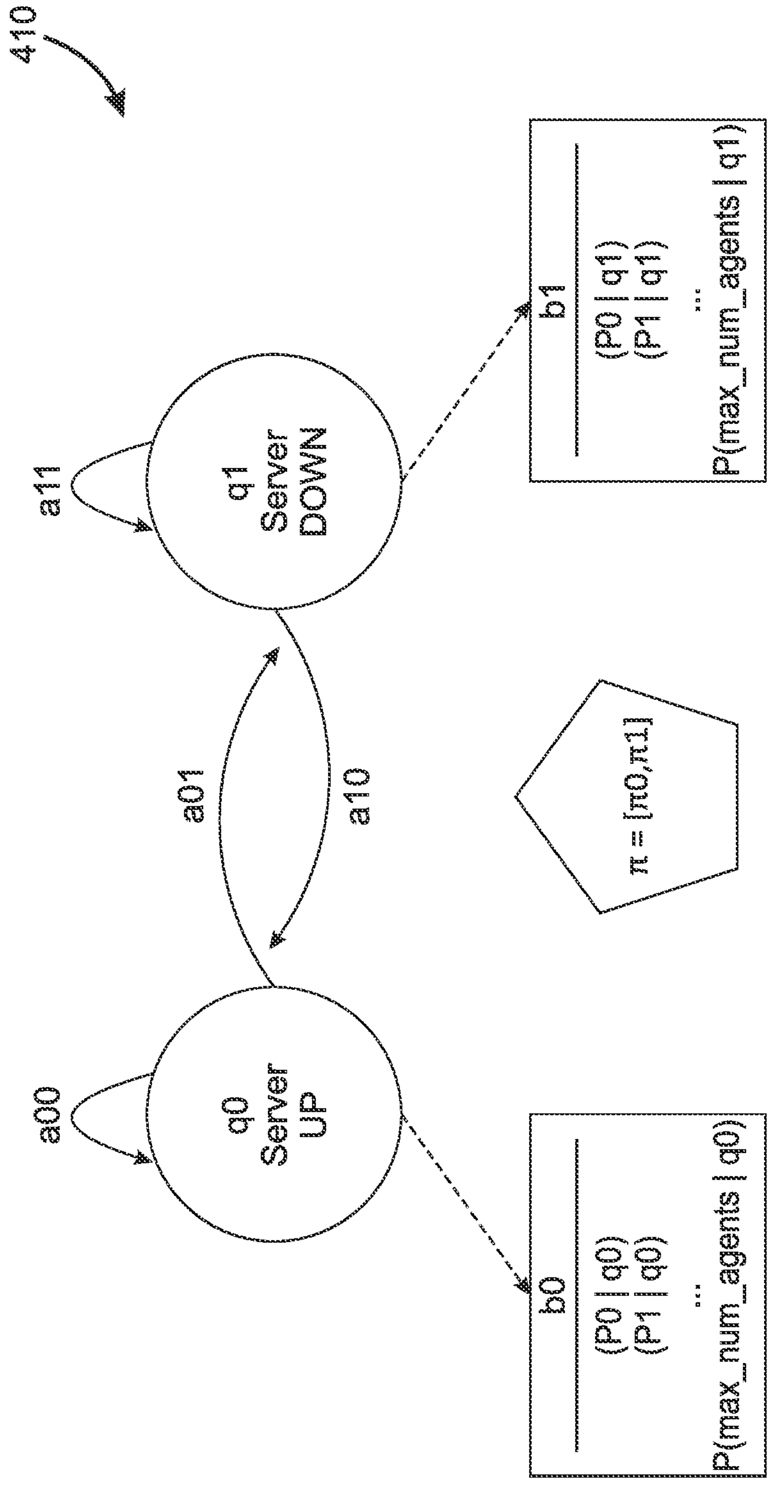

FIG. 4B illustrates an HMM 410 in accordance with the definition above. As can be seen, only five variables need to be properly defined. For instance, these variables may be defined as:

a00—probability for the server to remain UP at timestamp t+1 when it was UP at timestamp t.

a11—probability for the server to remain DOWN at timestamp t+1 when it was DOWN at timestamp t.

π0—probability for the observation sequence to start with a status UP.

p—probability of detecting an anomaly on an agent when the server is DOWN.

q—probability of detecting an anomaly on an agent when the server is UP.

The last two probabilities, p and q, help build the b0 and b1 emission probabilities using the definition of the binomial probability:

$$P(x \text{ agents anomalous} \mid S_i = q_0) = \binom{n_{max\ agents}}{x} q^x (1-q)^{n_{max\ agents}-x}$$

$$P(x \text{ agents anomalous} \mid S_i = q_1) = \binom{n_{max\ agents}}{x} p^x (1-p)^{n_{max\ agents}-x}$$

Since the HMM above only has two hidden states (i.e., server UP or DOWN), network monitoring process 248 may simply the calculation of their distributions by calculating the probability of one of them. For instance, network monitoring process 248 may compute:

$$P(S_{t=1} \mid o_1, o_2, \ldots, o_t, o_{t+1}, \ldots, o_T) = \frac{\alpha_t(1)\beta_t(1)}{P(o_1, o_2, \ldots, o_T)} = \frac{\alpha_t(1)\beta_t(1)}{\sum_{i=0}^{i=1} \alpha_t(i)\beta_t(i)}$$

Here, the forward component α and backward component β correspond to the following probabilities:

$$\alpha_t(i) = P(o_1, o_2, \ldots, o_T, Q_t = i)$$

$$\beta_t(i) = P(o_1, o_2, \ldots, o_T \mid Q_t = i)$$

Of course, it should also be noted that most implementations do not require the use of a backward component, particularly if the alert mechanism is to operate in real-time. This allows the system to report only on current issues.

Thus, network monitoring process 248 may compute α as follows:

$$\text{Initialization: } \alpha_1(i) = \prod(i) b_i(O_1)$$

$$\text{Induction: } \alpha_{t+1}(j) = \left[\sum_{i=1}^{N} \alpha_t(i) a_{ij}\right] b_j(O_{t+1})$$

Similarly, network monitoring process 248 may compute β as follows:

$$\text{Initialization: } \beta_T(i) = 1$$

$$\text{Induction: } \beta_t(i) = \sum_{j=1}^{N} a_{ij} b_j(O_{t+1}) \beta_{t+1}(j)$$

In some instances, network monitoring process 248 may calculate a real-time estimation of the probability by excluding the parameter β from the computation since, when analyzing the latest element of a stream, it will not have access to the future elements.

Figure 5A:
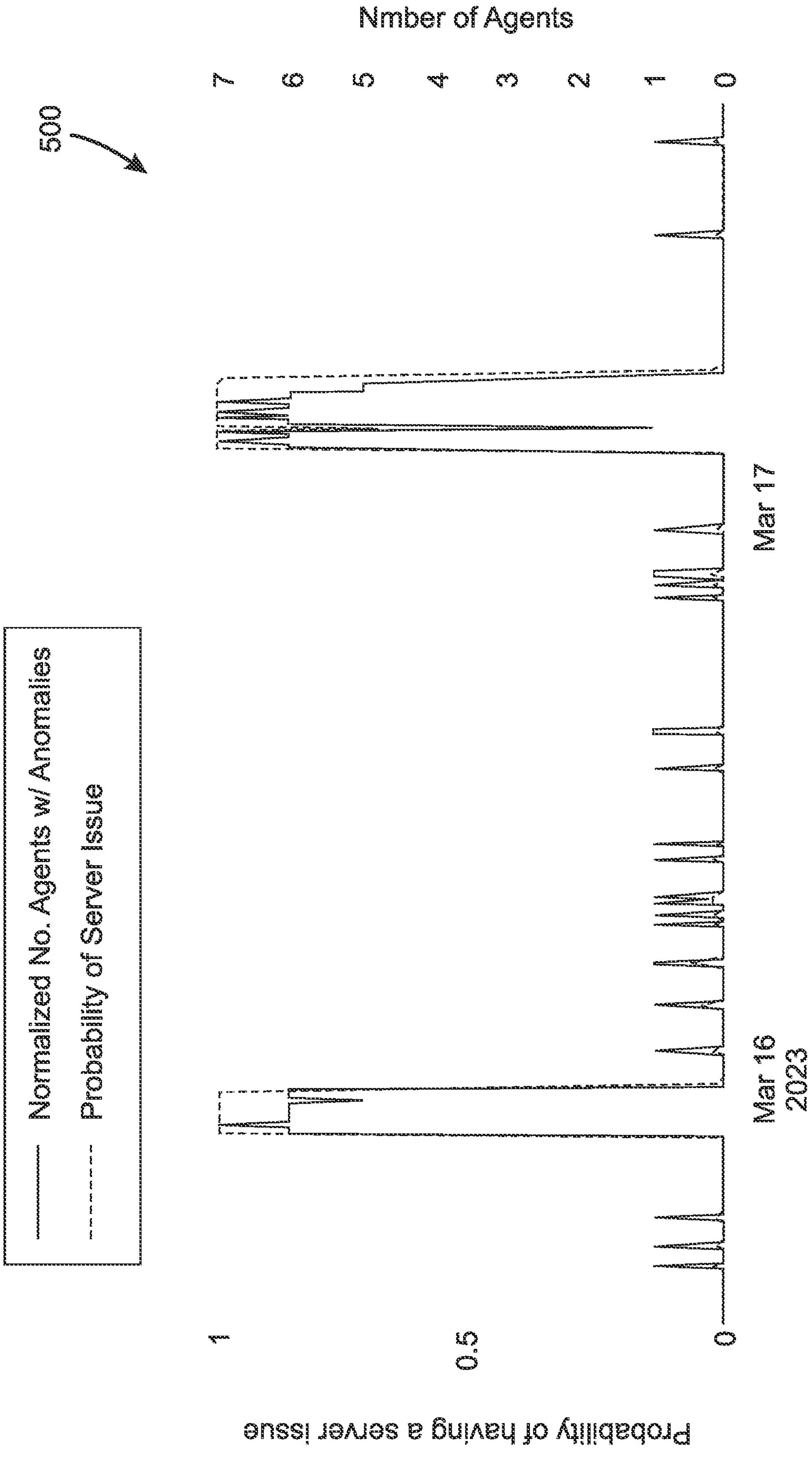
FIGS. 5A-5B illustrate example plots of the probability of there being a server issue over time.
Figure 5B:
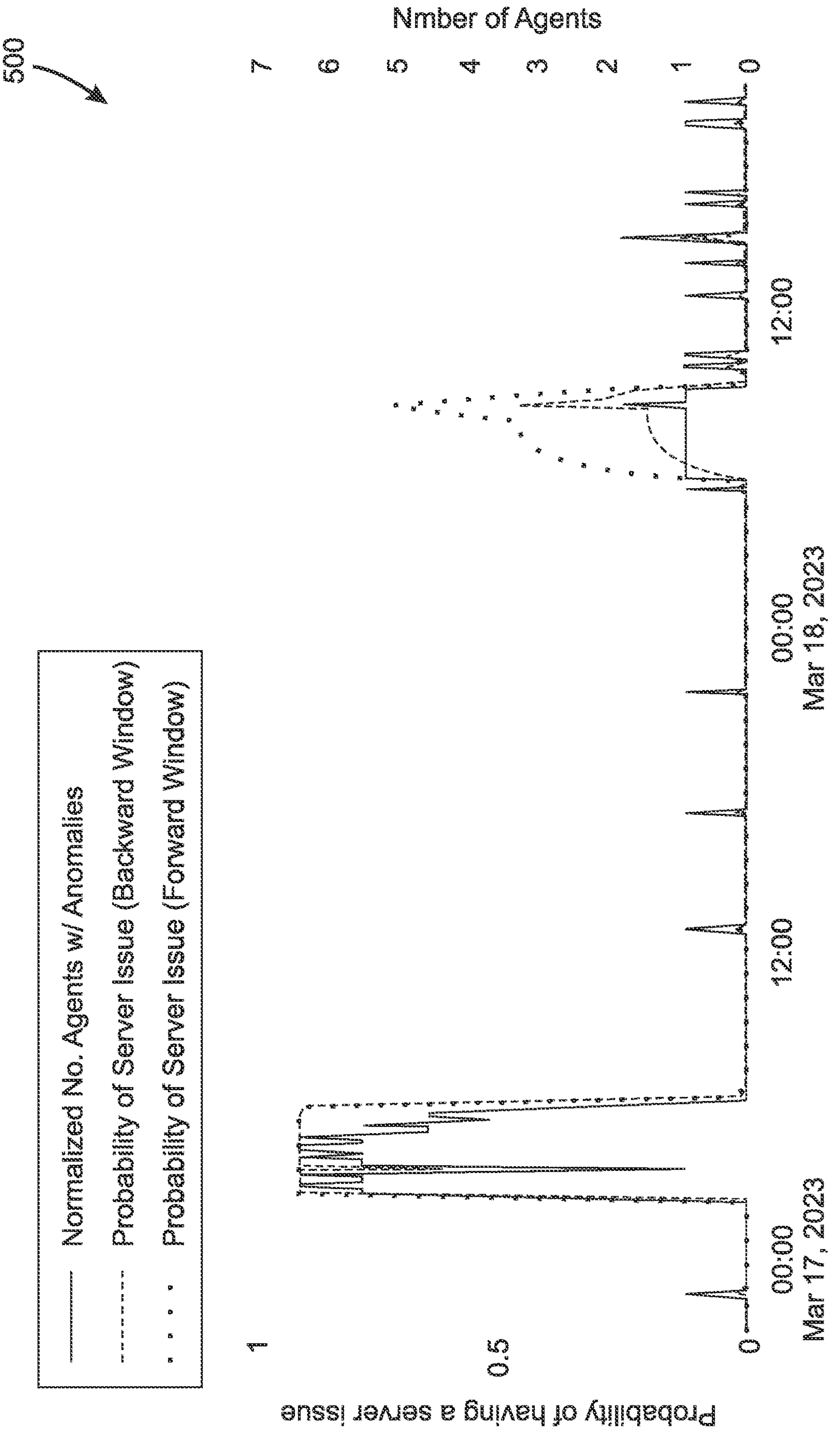

A prototype implementing the techniques herein was created and FIGS. 5A-5B illustrate example plots from that prototype system. More specifically, FIG. 5A shows a plot 500 of the probability of having a server issue vs. the normalized number of agents with anomalies over time. For purposes of proof-of-concept, the following parameters were set for the HMM:

a00=0.99—probability for the server to remain UP at timestamp t+1 when it was UP at timestamp t.

a11=0.50—probability for the server to remain DOWN at timestamp t+1 when it was DOWN at timestamp t.

π0=0.99—probability for the observation sequence to start with a status UP. Note that this parameter is not very important as it only impacts the first iterations, but it is a natural assumption to choose the prior probability of having an UP status, which can be readily calculated from the transition probabilities using the steady-state equation: x=x*a00+(1−x)*(1−a11)

p=0.1—probability of detecting an anomaly on an agent when the server is DOWN.

q=0.03—probability of detecting an anomaly on an agent when the server is UP. Here, alternatively, the system can use the observed rate of anomalies. In doing so, the assumption is that the server being DOWN is a rare occurrence and that the average rate of anomalies is a good estimate of the average rate of anomalies when the server is UP (i.e., since the DOWN state is so rare, the average rate of anomalies when the server is UP will be very close to the overall average rate of anomalies).

Based on simply the number of agents with anomalies, the prototype system computed the probability of having a server issue. In the example show in plot 500, it did so using only a backward window, therefore using only the a value above. As can be seen, big steps in the number of agents being anomalous are properly identified as being almost certainly a consequence of being a server issue while individual, smaller spikes are filtered out. Two behaviors can be observed impacting the output probability: the overall number of agents showing an anomaly, and its duration, as key elements.

In the example above, the prototype focused on only looking at the probability of being in a given server state knowing a sequence of past observations. However, if a delay in the alerting time is considered acceptable, a forward-backward approach can be used to its full extend by also including the computation of the value of β using a forward-looking window. In FIG. 5B below, plot 510 shows a comparison of the probability of having a server issue between using only a backward-looking window and using both forward-looking and backward-looking windows. Here, the prototype system used windows of ten timestamp steps for both.

As shown, the information of the forward window brings greater confidence in the system to provide a probability of an anomaly. However, it comes with a cost, as every step of forward window included in the HMM will be a delay in the generation of any alerts. All in all, providing bigger windows for both forward and backward elements enables the model to be more confident in the results it displays: for real anomalous steps the probability of having a server issue is going to skyrocket while, for individual spikes, it is going to be close to zero. The final decision on the sizes of those windows will come from two limitations:

Performance: the HMM solution is not costly when simply iterating over the aggregated number of agents on the window size to compute α and β. But doing so over multiple tests, of multiple network operators, and multiple metrics, could add up to an exhaustive cost in the overall system. In addition, the length of the forward window, if one is used, will also come at a performance cost.

Delay: the definition of having a forward window in the observation sequence means that the system is waiting for new datapoints to provide the probability of a server issue. For datapoints updating every five minutes, and a forward window of 5 elements, it would mean that there would be a delay of twenty-five minutes before issuing an alert. This is likely unacceptable for a typically network monitoring system, but the examples discussed above show that there are some benefits to having at least a singular element in the forward window.

Figure 6:
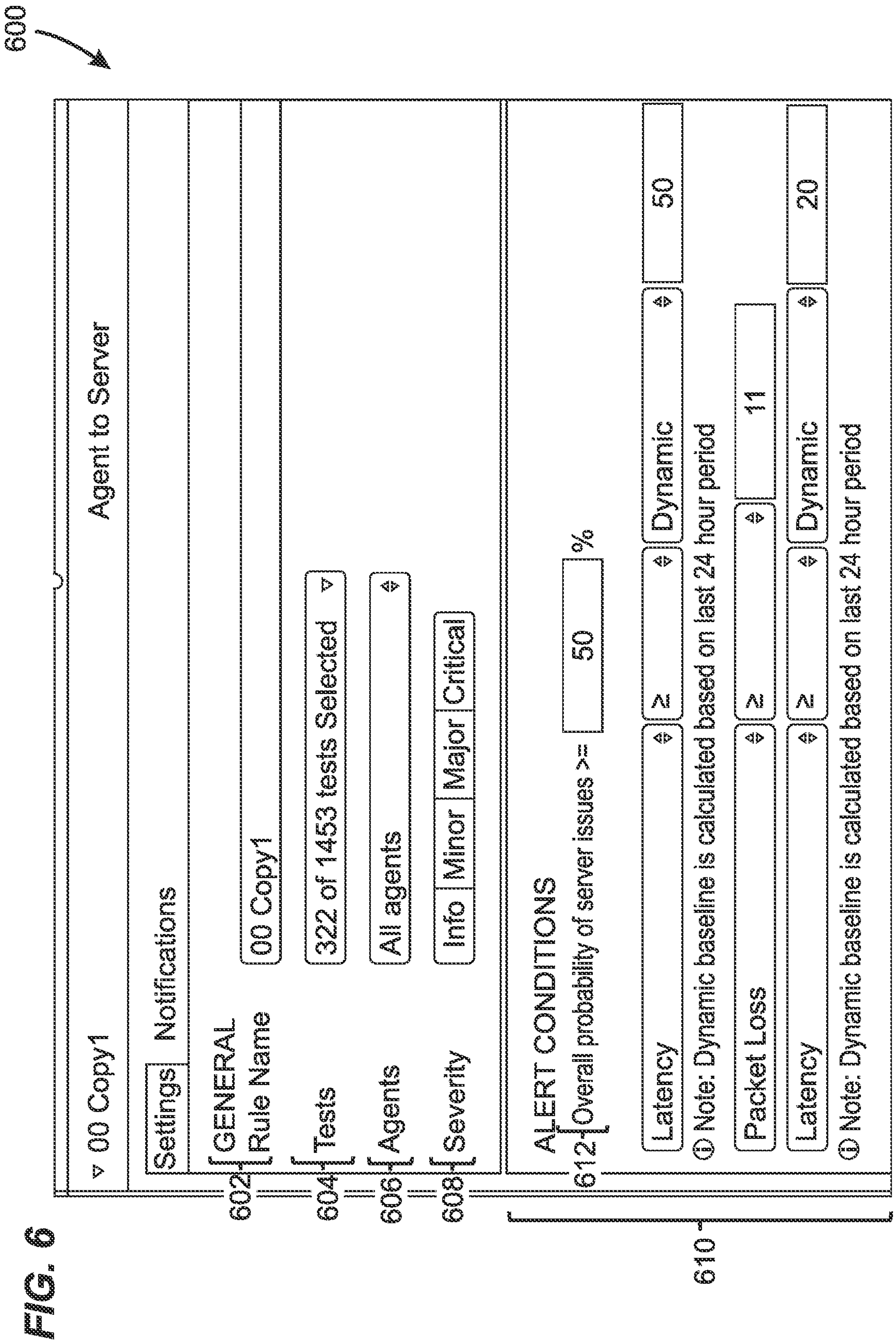
FIG. 6 illustrates an example user interface allowing for control over issue alerts.

FIG. 6 illustrate an example user interface 600 that allows for control over issue alerts, according to various embodiments. As shown, the network monitoring system may provide various user interfaces for display, to allow an administrator to control the HMM-based alerting of the network monitoring system. For instance, user interface 600 may include various inputs options, such as any or all of the following:

Rule name 602—this allows the administrator to name, save, and retrieve an alerting rule for the network monitoring system. For instance, another user interface may allow the administrator to activate or deactivate saved rules, as desired.

Tests 604—this allows the administrator to specify which types of tests are to be conducted in the network, to obtain telemetry from the network.

Agents 606—this allows the administrator to specify which agents in the network are to perform the tests.

Severity 608—this allows the administrator to specify how sensitive the system should be when raising alerts and may be labeled as such, alternatively.

Alert conditions 610—this allows the administrator to specify further conditions that control what the systems considers to be anomalous. The problem is that with some probability, individual agent tests may fail spuriously. Triggering an alert on *any* agent failure would therefore result in many false alerts. To overcome that, the system may use heuristics which aggregate both over several agents and over time, in the form: "At least X agents fail for Y out of Z times in a row." The intuition here is clear: spurious failures have no reason to be concentrated in time or across agents, so if there is a big enough concentration of failures across agents and time, there is much more likely to be a real underlying issue.

Issue probability 612—as shown, one particular alert condition 610 that user interface 600 may include is a threshold probability for the probability computed using the HMM-based approach herein. For instance, an administrator may opt to receive an alert if the probability of a server issue exceeds 50% (or another threshold).

Figure 7:
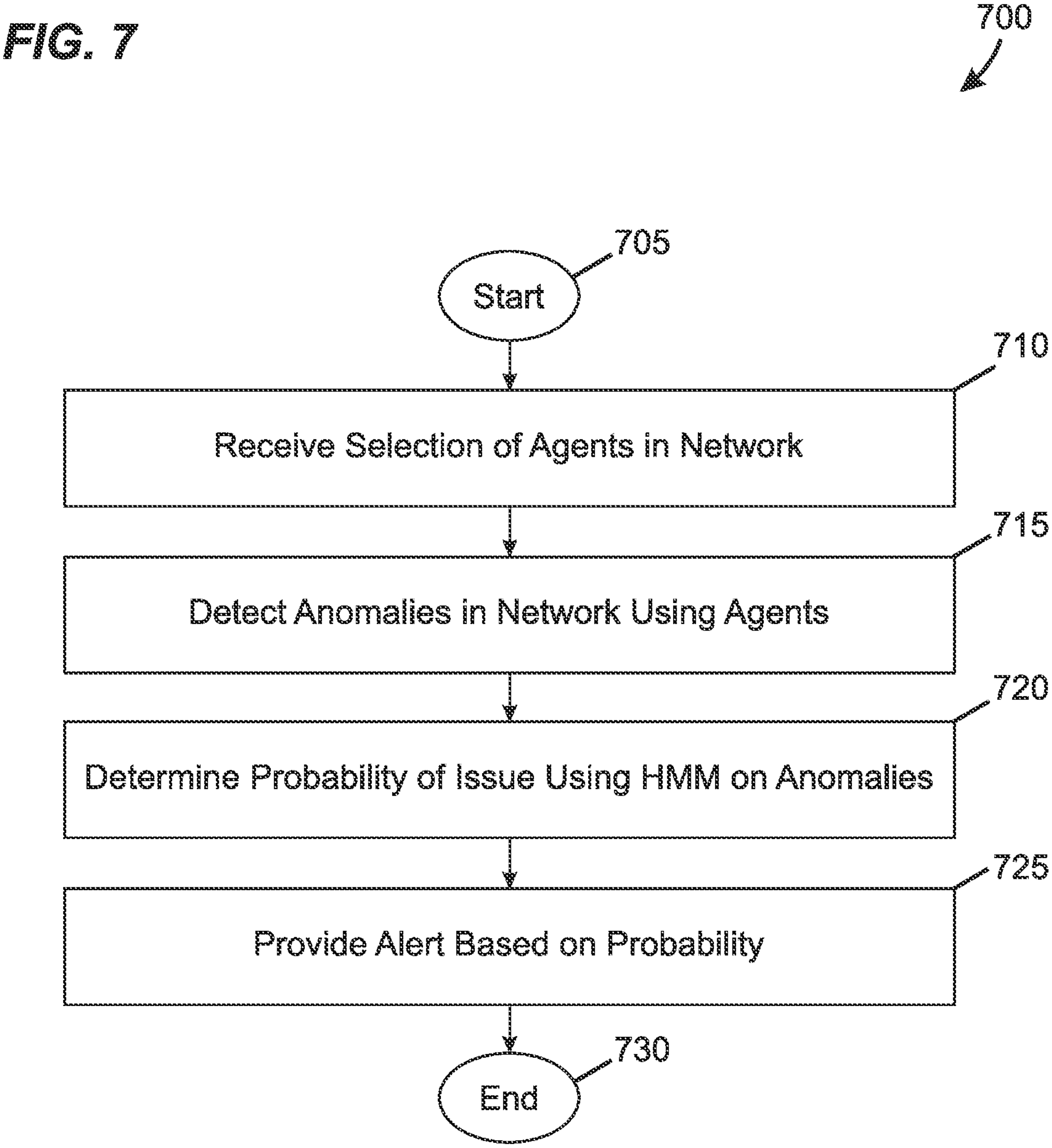
FIG. 7 illustrates an example simplified procedure for using a Hidden Markov Model (HMM) to calculate the probability of an underlying issue in network monitoring systems.

FIG. 7 illustrates an example simplified procedure 700 (e.g., a method) for using a Hidden Markov Model (HMM) to calculate the probability of an underlying issue in network monitoring systems, in accordance with one or more embodiments described herein. For example, a non-generic, specifically configured device (e.g., device 200) may perform procedure 700 by executing stored instructions (e.g., process 248), such as in conjunction with a network monitoring service. The procedure 700 may start at step 705, and continues to step 710, where, as described in greater detail above, the device may receive, via a user interface, a selection of agents in a network. In some instances, the agents perform testing in the network with respect to a target destination (e.g., a server, etc.). For instance, the testing may entail the agents sending probe packets towards the target destination.

At step 715, as detailed above, the device may detect, based on data from the selection of agents, anomalies in the network. In various instances, at least one agent is executed by a router or endpoint in the network. In some cases, the device may also perform aggregation on the data from the selection of agents.

At step 720, the device may determine a probability of an issue in the network based on a number of the selection of agents associated with the anomalies, as described in greater detail above. In some implementations, the issue in the network corresponds to a server being down. According to various implementations, the device determines the probability of the issue in the network by using information regarding the anomalies in network as input to a Hidden Markov Model (HMM). In some cases, the issue in the network is a hidden state of the Hidden Markov Model. In one implementation, the Hidden Markov Model assesses both forward and backward windows for the anomalies.

At step 725, as detailed above, the device may provide, based on the probability, an alert indicative of the issue to the user interface. In some implementations, the device may receive, via the user interface, a threshold for the probability, wherein the device provides the alert when the probability exceeds the threshold. In further implementations, the device may also rely on a second threshold parameter to determine when the alert is cleared. For instance, the device may raise the alert when the issue probability is above 90% and only clear that alert when it drops below 50%. This makes the alert more stable and avoids fluctuations in borderline cases.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using a Hidden Markov Model (HMM) to calculate the probability of an underlying issue in network monitoring systems, it is to be understood that various other adaptations and modifications may be made within the spirit and scope of the embodiments herein. For example, while certain embodiments are described herein with respect to using certain models for purposes of anomaly or change detection, the models are not limited as such and may be used for other functions, in other embodiments. Further, non-binary anomaly detection can also be used herein, as well as specific emission probabilities per agent, rather than the same one for all agents. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a device and via a user interface, a user-specified selection of agents in a network, wherein the user-specified selection defines which agents to use for monitoring the network;

detecting, by the device and based on data from the user-specified selection of agents, anomalies in the network;

determining, by the device, a mathematical probability of an issue existing in the network by inputting, into a Hidden Markov Model, information regarding a number of agents from the user-specified selection of agents that are associated with the anomalies, wherein only the user-specified selection of agents are considered, and wherein the issue existing in the network is a hidden state of the Hidden Markov Model; and providing, by the device and based on the probability, an alert indicative of the issue to the user interface.

2. The method as in claim 1, further comprising:

receiving, at the device and via the user interface, a threshold for the probability, wherein the device provides the alert when the probability exceeds the threshold.

3. The method as in claim 1, wherein the issue in the network corresponds to a server being down.

4. The method as in claim 1, wherein at least one agent is executed by a router or endpoint in the network.

5. The method as in claim 1, wherein the Hidden Markov Model assesses both forward and backward windows for the anomalies.

6. The method as in claim 1, wherein the agents perform testing in the network with respect to a target destination.

7. The method as in claim 6, wherein the testing entails the agents sending probe packets towards the target destination.

8. The method as in claim 1, further comprising:

performing aggregation on the data from the user-specified selection of agents.

9. An apparatus, comprising:

one or more network interfaces;

a processor coupled to the one or more network interfaces and configured to execute one or more processes; and a memory configured to store a process that is executable by the processor, the process when executed configured to:

receive, via a user interface, a user-specified selection of agents in a network, wherein the user-specified selection defines which agents to use for monitoring the network;

detect, based on data from the user-specified selection of agents, anomalies in the network;

determine a mathematical probability of an issue existing in the network by inputting, into a Hidden Markov Model, information regarding a number of agents from the user-specified selection of agents that are associated with the anomalies, wherein only the user-specified selection of agents are considered, and wherein the issue existing in the network is a hidden state of the Hidden Markov Model; and provide, based on the probability, an alert indicative of the issue to the user interface.

10. The apparatus as in claim 9, wherein the process when executed is further configured to:

receive, via the user interface, a threshold for the probability, wherein the apparatus provides the alert when the probability exceeds the threshold.

11. The apparatus as in claim 9, wherein the issue in the network corresponds to a server being down.

12. The apparatus as in claim 9, wherein at least one agent is executed by a router or endpoint in the network.

13. The apparatus as in claim 9, wherein the Hidden Markov Model assesses both forward and backward windows for the anomalies.

14. The apparatus as in claim 9, wherein the agents perform testing in the network with respect to a target destination.

15. The apparatus as in claim 14, wherein the testing entails the agents sending probe packets towards the target destination.

16. A tangible, non-transitory, computer-readable medium storing program instructions that cause a device to execute a process comprising:

receiving, at the device and via a user interface, a user-specified selection of agents in a network, wherein the user-specified selection defines which agents to use for monitoring the network;

detecting, by the device and based on data from the user-specified selection of agents, anomalies in the network;

determining, by the device, a mathematical probability of an issue existing in the network by inputting, into a Hidden Markov Model, information regarding a number of agents from the user-specified selection of agents that are associated with the anomalies, wherein only the user-specified selection of agents are considered, and wherein the issue existing in the network is a hidden state of the Hidden Markov Model; and providing, by the device and based on the probability, an alert indicative of the issue to the user.

17. The method as in claim 1, wherein the Hidden Markov Model has parameters including:

a probability of the issue not existing when the issue did not exist at a previous point in time;

a probability of the issue not existing when the issue did exist at the previous point in time;

a probability of any agent detecting any anomaly when the issue does not exist; and a probability of any agent detecting any anomaly when the issue does exist.

18. The method as in claim 17, wherein parameters further include a probability of the issue not existing at a start time of an observation sequence.

19. The apparatus as in claim 9, wherein the Hidden Markov Model has parameters including:

a probability of the issue not existing when the issue did not exist at a previous point in time;

a probability of the issue not existing when the issue did exist at the previous point in time;

a probability of any agent detecting any anomaly when the issue does not exist; and a probability of any agent detecting any anomaly when the issue does exist.

20. The tangible, non-transitory, computer-readable medium as in claim 16, wherein the Hidden Markov Model has parameters including:

a probability of the issue not existing when the issue did not exist at a previous point in time;

a probability of the issue not existing when the issue did exist at the previous point in time;

a probability of any agent detecting any anomaly when the issue does not exist; and a probability of any agent detecting any anomaly when the issue does exist.

* * * * *